Patented Sept. 22, 1942

2,296,375

UNITED STATES PATENT OFFICE 2,296,375

HALOGENATED META-DIOXANES

Erving Arundale, Union, and Louis A. Mikeska, Westfield, N. J., assignors to Standard Oil Development Company, a corporation of Delaware No Drawing. Application October 12, 1939, Serial No. 299,152

17 Claims. (Cl. 260—338)

This invention relates to a process for the conversion of unsaturated halides to valuable halogenated meta-dioxanes or halogenated unsymmetrical cyclic diethers which are novel compounds. The meta-dioxanes or unsymmetrical cyclic diethers are organic compounds containing a six-membered ring composed of four carbon atoms and two oxygen atoms in which the two oxygen atoms are attached to the same carbon atom and having the formula—

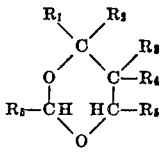

where $R_1$, $R_2$, $R_3$, $R_4$, and $R_5$ are hydrogen, halogen, alkyl, aryl, aralkyl or a halogen-substituted alkyl, aryl or aralkyl group.

In the above formula, the atoms forming the six-membered ring are numbered, for the purposes of nomenclature, from 1 to 6 inclusive, starting with the oxygen atom situated between the two carbon atoms to which are attached the $R_5$ substituents as No. 1 and proceeding in a clockwise direction.

According to the present invention, halogenated organic compounds containing an olefinic linkage are reacted with an aldehyde in the presence of an acidic catalyst to yield halogenated meta-dioxanes. This invention contemplates employing as a starting material any organic compound containing a halogen atom and an unsaturated linkage, such as, allyl chloride, methallyl chloride, isocrotyl chloride, 2-methyl-3-chloro butene-1, 3-chloro butene-1, 2-methyl-2-chloro butene-2, or other halo olefins. The aldehyde, preferably formaldehyde, may, however, be acetaldehyde, benzaldehyde, mono- or dichloroacetaldehyde, or compounds, such as trioxymethylene and paraldehyde, which decompose to yield an aldehyde. The term "acidic catalyst" is meant to include solutions, of between 10% and 90% concentration, of acids, such as sulfuric, sulfurous, phosphoric, phosphorous, fluorsulfonic, fluosilicic, dihydroxyfluoboric or hydrofluoboric acid, or acid-acting metallic salts, such as sodium hydrogen sulfate, sodium di-hydrogen phosphate, zinc sulfate, ferric sulfate, aluminum sulfate, and the like. The reaction proceeds at atmospheric pressure and room temperature, but the use of higher temperatures materially increases the rate of reaction. Since the reaction is exothermic, some means of cooling may be provided to dissipate the heat of reaction. The molar ratio of unsaturated organic halide to the aldehyde should be at least 1 to 2 but is preferably at least 1.5 to 2.

The products of these reactions are usually liquids having a specific gravity greater than 1, and boiling above 100° C. These products are useful as solvents and as intermediates for further chemical reactions.

Representative compounds obtainable according to this invention are: 4-chloromethyl meta-dioxane, from allyl chloride and formaldehyde; 4-methyl-4-chloromethyl meta-dioxane, from methallyl chloride and formaldehyde; 4-4-dimethyl-5-chloro meta-dioxane, from isocrotyl chloride and formaldehyde; 2,4,4,6-tetramethyl-5-chloro meta-dioxane, from isocrotyl chloride and acetaldehyde; and 2,4,6-trimethyl-4-chloromethyl meta-dioxane, from methallyl chloride and acetaldehyde.

Halogenated glycols are formed as by-products of the reaction. For example, isocrotyl chloride and formaldehyde react to form small amounts of 3-methyl-2-chloro-1,3-butanediol.

The following examples are given for the purpose of illustrating the process of this invention:

Example 1

270 grams of methallyl chloride and 120 grams of trioxymethylene were placed in a container equipped with a mechanical stirrer and reflux condenser. 100 cc. of 50% (by weight) sulfuric acid were then added and the mixture was stirred and heated to 50° C. When the temperature of the reaction mixture reached 50° C., the heating was stopped. The temperature continued to rise due to the liberated heat of reaction, and was maintained at between 65 and 70° C. by means of regulated cooling. The reaction was complete within ½ hour but the reaction mixture was stirred for another 1½ hours, during which time the temperature dropped to 35° C. After agitation was stopped, two layers immediately formed. The acid layer was drawn off and could be recycled. The product layer was neutralized with dilute carbonate solution and the neutralized product was then dried and fractionated.

236 grams of 4-methyl-4-chloromethyl meta-dioxane, boiling at 187–190° C., were obtained, corresponding to a 76% yield based on formaldehyde charged. The unreacted methallyl chloride may be recycled.

Example 2

120 grams of trioxymethylene and 270 grams of isocrotyl chloride were placed in a reactor equipped with a stirrer and reflux condenser. 200 cc. of 50% (by weight) sulfuric acid were added and the mixture was stirred and heated to 58° C. The heating was then stopped but the temperature of the reaction mixture rose to 63° C. The aldehyde reacted completely within ¼ hour. The reaction mixture was stirred for an additional hour and was allowed to cool during this time. After agitation was stopped, two layers immediately formed. The acid layer was then removed and the product layer was neutralized with dilute carbonate solution, dried, and then vacuum distilled. 200 grams of 4,4-methyl-5-chloro meta-dioxane, boiling at 57–59° C. at 2 mm., were obtained. 46 grams of 3-methyl-2-chloro-1,3-butanediol, boiling at 100–115° C. at 4 mm., were also obtained as a by-product.

*Example 3*

400 grams of methallyl bromide and 120 grams of trioxymethylene were placed in a container equipped with a mechanical stirrer and reflux condenser. 300 cc. of 60% (by weight) phosphoric acid were then added and the mixture was stirred and heated to 65° C. The mixture was maintained at between 65 and 70° C. for three hours, after which the product was isolated and purified as in the above examples. The product, 4-methyl-4-bromomethyl meta-dioxane, weighed 290 grams.

The above disclosure and examples are given for the purpose of illustration only and are not to be construed as in any way limiting the invention.

What is claimed is:

1. As a composition of matter a meta-dioxane having the following formula:

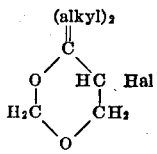

2. As a composition of matter, 4,4-dimethyl-5-chloro meta-dioxane.

3. As a composition of matter a meta-dioxane having the following formula:

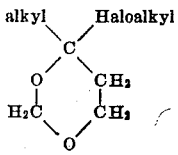

4. As a composition of matter a meta-dioxane having the following formula:

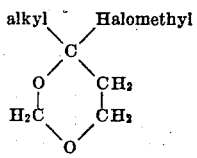

5. As a composition of matter, 4-methyl-4-chloromethyl meta-dioxane.

6. As a composition of matter a meta-dioxane having the following formula:

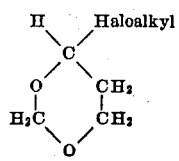

7. As a composition of matter, 4-chloromethyl meta-dioxane.

8. The process of producing a halogenated meta-dioxane which comprises reacting one mol of a halogenated acyclic hydrocarbon containing an olefinic linkage and more than two carbon atoms to the molecule with two mols of a saturated aldehyde in the presence of an acid-reacting catalyst.

9. The process of producing a halogenated meta-dioxane which comprises reacting one mol of a halogenated acylic hydrocarbon containing an olefinic linkage and more than two carbon atoms to the molecule with two mols of a saturated aldehyde in the presence of an acid-reacting catalyst, neutralizing the reaction product and isolating the halogenated meta-dioxane.

10. The process of producing a halogenated meta-dioxane which comprises condensing one mol of an unsaturated aliphatic halide containing more than two carbon atoms to the molecule with two mols of a saturated aldehyde in the presence of an acid-reacting catalyst.

11. The process of producing 4-methyl-4-chlormethyl meta-dioxane which consists in contacting methallyl chloride and trioxymethylene in the presence of sulfuric acid and recovering the said 4-methyl-4-chlormethyl meta-dioxane.

12. The process of producing 4-methyl-4-chlormethyl meta-dioxane which consists in refluxing methallyl chloride and trioxymethylene in the presence of sulfuric acid of 50% concentration at a temperature of between 65 and 70° C., neutralizing the product with dilute carbonate solution, drying the neutral mixture and recovering the 4-methyl-4-chlormethyl meta-dioxane by distillation.

13. The process of producing 4,4-dimethyl-5-chloro meta-dioxane which consists in contacting one mol of isocrotyl chloride and two mols of trioxymethylene in sulfuric acid of from 10 to 90% concentration and recovering the 4,4-dimethyl-5-chloro meta-dioxane.

14. The process of producing 4,4-dimethyl-5-chloro meta-dioxane which consists in refluxing one mol of isocrotyl chloride and two mols of trioxymethylene in the presence of 50% sulfuric acid at a temperature of 58–63° C., neutralizing the product with dilute carbonate solution, drying the neutral mixture and recovering the 4,4-dimethyl-5-chloro meta-dioxane by distillation.

15. The process of producing a halogenated meta-dioxane which comprises condensing one mol of an unsaturated aliphatic olefinic halide containing more than two carbon atoms to the molecule with two mols of a saturated aldehyde in the presence of a ternary acid of from 10 to 90% concentration, neutralizing the reaction product and isolating the halogenated meta-dioxane.

16. The process of producing a chlorinated meta-dioxane which comprises condensing one mol of an unsaturated aliphatic olefinic chloride containing more than two carbon atoms to the molecule with two mols of a saturated aldehyde in the presence of a ternary acid of from 10 to 90% concentration, neutralizing the reaction product and isolating the chlorinated meta-dioxane.

17. Halogenated meta-dioxanes of the general formula—

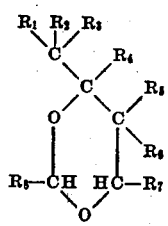

wherein $R_1$, $R_2$, $R_3$, $R_4$, $R_5$ and $R_6$ are chosen from the class consisting of hydrogen, halogen, alkyl, and halogen-substituted alkyl groups; $R_7$ and $R_8$ are identical constituents selected from the class consisting of hydrogen, halogen, alkyl, and halogen-substituted alkyl groups; at least one of said $R_1$ to $R_6$ radicals being chosen from the group consisting of halogen and halogen-substituted alkyl radicals.

ERVING ARUNDALE.
LOUIS A. MIKESKA.